(12) United States Patent
Huang et al.

(10) Patent No.: US 9,137,811 B2
(45) Date of Patent: Sep. 15, 2015

(54) METHOD AND SYSTEM OF REPORTING MEASUREMENT RESULTS IN A MULTI-CARRIER SYSTEM AND USER EQUIPMENT THEREOF

(75) Inventors: Yada Huang, Guangdong Province (CN); Xiaojuan Shi, Guangdong Province (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 525 days.

(21) Appl. No.: 13/259,691

(22) PCT Filed: Oct. 9, 2010

(86) PCT No.: PCT/CN2010/077625
§ 371 (c)(1),
(2), (4) Date: Sep. 27, 2012

(87) PCT Pub. No.: WO2011/124064
PCT Pub. Date: Oct. 13, 2011

(65) Prior Publication Data
US 2013/0016613 A1 Jan. 17, 2013

(30) Foreign Application Priority Data
Apr. 9, 2010 (CN) .......................... 2010 1 0145978

(51) Int. Cl.
*H04W 72/08* (2009.01)
*H04L 12/26* (2006.01)
*H04L 1/00* (2006.01)
*H04W 72/04* (2009.01)
*H04L 5/00* (2006.01)

(52) U.S. Cl.
CPC ........... *H04W 72/085* (2013.01); *H04L 1/0027* (2013.01); *H04L 43/50* (2013.01); *H04L 5/001* (2013.01); *H04W 72/0413* (2013.01)

(58) Field of Classification Search
CPC ...... H04L 12/2602; H04L 43/00; H04L 43/50
See application file for complete search history.

(56) References Cited

U.S. PATENT DOCUMENTS

| | | | | |
|---|---|---|---|---|
| 2003/0005153 | A1* | 1/2003 | Carbonell | 709/239 |
| 2003/0005154 | A1* | 1/2003 | Thurman | 709/239 |
| 2011/0287767 | A1* | 11/2011 | Huang et al. | 455/436 |
| 2013/0058244 | A1* | 3/2013 | Huang | 370/252 |

FOREIGN PATENT DOCUMENTS

| | | |
|---|---|---|
| CN | 101155376 A | 4/2008 |
| CN | 101605352 A | 12/2009 |
| WO | 2009022805 A1 | 2/2009 |

OTHER PUBLICATIONS

International Search Report dated Jan. 13, 2011, issued in corresponding International Application No. PCT/CN2010/077625.

* cited by examiner

Primary Examiner — Raj Jain
(74) Attorney, Agent, or Firm — Scully, Scott, Murphy & Presser, P.C.

(57) ABSTRACT

The present invention discloses method and system of reporting the measurement results in a multi-carrier system to a network side equipment and the user equipment thereof, wherein the method includes: dividing the measurement tasks into measurement task groups; the UE determining whether the measurement results of the measurement tasks in the measurement task groups meet the report conditions corresponding to the measurement task groups; the UE generating a measurement report according to the measurement results and reporting the measurement report to the network side equipment. The present invention enhances the flexibility of reporting the measurement report by the UE.

20 Claims, 4 Drawing Sheets

METHOD AND SYSTEM OF REPORTING MEASUREMENT RESULTS IN A MULTI-CARRIER SYSTEM AND USER EQUIPMENT THEREOF

FIELD OF THE INVENTION

The present invention relates to the communication field, and more particularly, to a method and system of reporting measurement results in a multi-carrier system and a user equipment (UE) thereof.

BACKGROUND OF THE INVENTION

Figure 1:
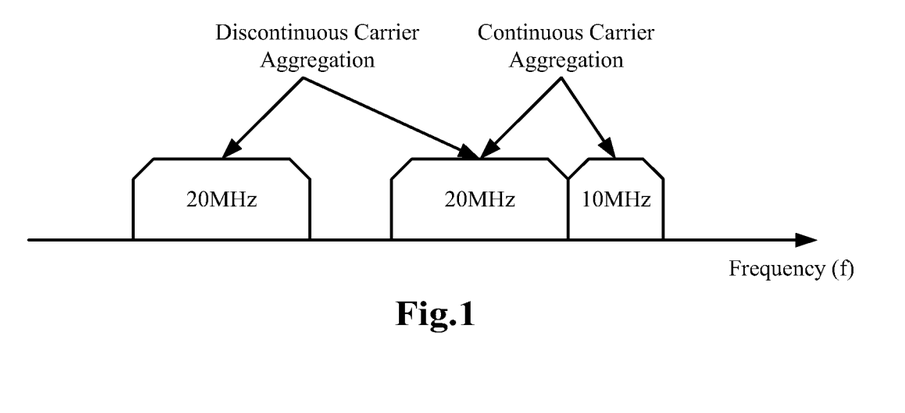
FIG. 1 is the schematic diagram of the carrier aggregation according to the related art.

To provide the mobile users with a higher data rate, the Long Term Evolution Advance (LTE-A) proposed a Carrier Aggregation (CA) technology aiming at providing a greater broadband for the user equipment with corresponding capacity so as to enhance the peak rate of the UE. In the LTE, the maximal downlink transmission bandwidth supported by the system is 20 MHz. The carrier aggregation is used to aggregate two or more Component Carriers (CC) for the purpose of supporting a downlink transmission bandwidth higher than 20 MHz but lower than 100 MHz. FIG. 1 is the schematic diagram of the carrier aggregation according to related art. The component carriers for carrier aggregation can be either continuous or discontinuous in frequency domain. The LTE-A using the carrier aggregation technology is a multi-carrier system.

In the mobile communication system, the UE can move between the cells. To ensure the service continuity and quality, after the user establishes a service, the UE is required to conduct measurement according to the configuration of the service base station and report the measurement report meeting the configuration requirement of the service base station so that the service base station can conduct reasonable switching determination according to the measurement report reported by the UE and other Radio Resource Management (RRM) algorithms, namely choose reasonable target cell to conduct switching so as to meet the mobility requirement.

In the connection state, the measurement behavior of the UE is controlled by the base station. The specific measurement process includes the following steps:

At Step 1, the network side (for example, a service base station) transmits the measurement control message to the UE, wherein the measurement control message includes a Measurement Object (MO) list, comprising the LTE frequency requiring measurement, each frequency is identified uniquely with a MOID (meansobjectId); a measurement Report Configuration (RC) list, comprising the attributes of each report configuration, for example, the measurement report is reported based on events or cycles, the corresponding configuration parameters, for example, the event type of the event-based reporting and the related parameters of the event type and the Time To Trigger (TTT) of the event-based reporting, wherein each report configuration is identified uniquely with a RCID (reportConfigId); a Measurement ID (MID) list, wherein the MID represents the identification of each specific measurement task, in the MID list, each MID is associated with a MOID and a RCID to represent one measurement task uniquely, namely represent the report configuration information of certain frequency uniquely. Besides, the measurement control information also includes the measurement threshold (s-Measure) which represents the signal quality threshold residing in the cell; the measurement Quantity Configuration, used to indicate the specific measurement quantity; and the Measurement Gap Configuration, used for the configuration of different frequency and different system.

At Step 2, the UE receives the measurement control message and gets the quantity of the measurement tasks through the quantity of the MIDs and the attributes of each measurement task through the MOID and the RCID corresponding to the MIDs, namely the MO and RC information of each measurement task.

At Step 3, the UE conducts measurement according to the configuration of the measurement control message and reports the measurement report meeting the RC configuration of each measurement task.

With respect to the measurement task whose report configuration (RC) is reported based on events, the UE measures the configured frequency (MO) and conducts an event evaluation to the measurement result of each cell measured on this frequency. If the measurement results of the cells are confirmed to meet the configured event entry condition of the RC within the configured TTT time thereof, and the cells have not been saved, the UE will locally save the cells meeting the entry condition and its measurement results in a cell list (cellsTriggeredList) identified with the MID of this measurement task, and transmit the measurement report generated by the UE to the network side after obtaining the best N cells regulated in the RC from the cell list in the order from strong to weak signal quality. Then, when the UE conducts an event evaluation and determines that the cells meeting the configured event exit condition of the RC within the configured TTT time thereof exist in the cell list, it will delete the cells meeting the exit condition and the measurement results thereof from the cell list. If there is no cell saved in the cell list after the deletion, the cell list identified by this MID will be deleted locally by the UE.

In an LTE system, to ensure its communication quality, the UE is required to measure the service cell all the time in the connection state. While for the adjacent cell, especially for the adjacent cell of different frequency and different system, the UE will consume extra electricity when conducting measurement. If the UE has only one radio frequency receiving equipment, it is allowed only to adjust the radio frequency receiving equipment from the service cell to the adjacent cell in the measurement gap configured by the base station so that its communication in the service cell is not affected. Moreover, the frequent measurement reporting of the UE will also occupy too many radio resources. Therefore, in order to meet the mobile demand of the UE in the connection state without consuming too much electricity or affecting its communication in the service cell, in an LTE system, the service base station will determine whether to configure different frequency/system measurement for the UE according to its signal quality in the service cell. Specifically, the configuration can be conducted in accordance with the following strategy: determine whether the UE conducts/stops the measurement task of different frequency/system according to the measurement results of the measurement events aiming at the service cell and configured for the UE by the base station—Event A1 (the signal quality of the service cell is larger than the threshold) and Event A2 (the signal quality of the service cell is smaller than the threshold). When the base station receives Event A2 reported by the UE, it will configure different frequency/system measurement tasks for the UE; while the base station receives Event A1 reported by the UE, it will delete the different frequency/system measurement tasks previously configured for the UE.

In an LTE system, to ensure its communication quality, when the UE is switched to the adjacent cell, the signal of the adjacent cell shall be sufficient to provide a secure communication quality for the UE. Therefore, the base station is required to configure measurement events aiming at the adjacent cell for the UE, such as Event A3 (the signal quality of the adjacent cell is an offset better than that of the service cell) and Event A5 (the signal quality of the service cell is smaller than threshold 1, and the signal quality of the adjacent cell is larger than threshold 2). These events are a kind of comparative event which needs to take the signal quality of both the service cell and the adjacent cell into consideration. When the base station receives the measurement reports of Event A3 or A5 reported by the UE, it can determine whether to switch the UE to the adjacent cell according to the switching determination as per the measurement report and other RRM algorithms.

In the carrier aggregation, the base station can configure the information of several carriers (called the configured carrier or work carrier) for the UE, and activate all or part of the carriers to let the UE conduct data transmission on the activated carriers. These carriers are known as activated carriers, while other configured carriers which have not been activated are known as deactivated carriers.

When providing the UE of the carrier aggregation with a larger bandwidth and a higher data rate, the electricity consumption of the UE is one of the problems requiring great consideration in related art of the carrier aggregation design. Therefore, to ensure the communication quality of the UE without consuming too much electricity, the base station in the carrier aggregation is also required to consider the signal quality of each activated carrier to determine whether to configure different frequency/system measurements for the UE. The switching of the UE to the adjacent cell will lead to the short-time interruption of the data transmission of the UE in the service cell and even certain loss of the data. Moreover, the switching process itself will cause great system overhead. Therefore, except some special strategies (for example, load balance) of the operators, unless the data transmission quality of the UE cannot be ensured in the service cell or the base station confirms that there is a adjacent cell better than the present service cell, the base station will not switch the UE to the adjacent cell. In the carrier aggregation, the base station is also required to consider the signal quality of each activated carrier comprehensively to determine whether to switch the UE to the adjacent cell so as to minimize unnecessary switching.

The inventor finds that, in related art, when the UE detects any measurement task configured by the base station meeting the trigger condition, for example, the service cell meets the entry or exit trigger conditions of the related events (Event A1 and A2) or the adjacent cell meets the entry trigger conditions of the comparative events (Event A3 and A5), it will generate a measurement report and report it to the base station, namely, the strategy of immediately reporting of all the measurement tasks as soon as they are triggered. However, this reporting method lacks flexibility when being used in the carrier aggregation.

SUMMARY OF THE INVENTION

The present invention aims at providing a method and system of reporting the measurement results in a multi-carrier system and user equipment thereof to solve at least the problems above.

According to one aspect of the present invention, a method of reporting the measurement results in a multi-carrier system comprises: dividing measurement tasks into measurement task groups; the UE determining whether measurement results of respective measurement tasks in one of the measurement task groups meet a report condition of the corresponding measurement task group; the UE generating a measurement report according to the measurement results; and the UE reporting the measurement report to the network side equipment.

According to another aspect of the present invention, a user equipment comprises: a grouping module, configured to divide measurement tasks into measurement task groups; a determination module, configured to determine whether measurement results of respective measurement tasks in one of the measurement task groups meet a report condition of the corresponding measurement task group; and a reporting module, configured to generate a measurement report according to the measurement result when a determination result of the determination module is yes, and report the measurement report.

According to another aspect of the present invention, a system for reporting measurement results in a multi-carrier system comprises a network side equipment and a UE, the network side equipment including a grouping module, configured to divide measurement tasks into measurement task groups; and a designation module, configured to explicitly designate the measurement task groups to the UE in a measurement control message; and the UE including: a determination module, configured to determine whether measurement results of the measurement tasks in one of the measurement task groups meet a report condition of the corresponding measurement task group; a reporting module, configured to generate a measurement report according to the measurement result when a determination result of the determination module is yes, and report the measurement report.

According to the present invention, by means of dividing the measurement tasks into groups and reporting a report under the condition that the measurement results in the group meet the report condition of the group, the problem of lack of flexibility with the reporting process in related art is solved and the reporting flexibility of the measurement report of the UE is enhanced.

BRIEF DESCRIPTION OF THE DRAWINGS

The accompanying drawings disclosed herein, constituting a part of the Description for further understanding the present invention, illustrate the present invention together with the exemplary embodiments and the description without limiting the present invention, wherein.

DETAILED DESCRIPTION OF THE EMBODIMENTS

The present invention will be further illustrated hereinafter in conjunction with the exemplary embodiments and accompanying drawings. It shall be noted that the embodiments in this application and the features in the embodiments can be mutually combined if no conflict appears.

In the connection state, the measurement behavior is controlled by the network side (for example, the base station), the network side transmits the related measurement information to the UE which will conduct measurement according to the information and report the measurement results in the form of measurement report to the network side so that the network side can conduct the subsequent measurement decision or switching determination.

Figure 2:
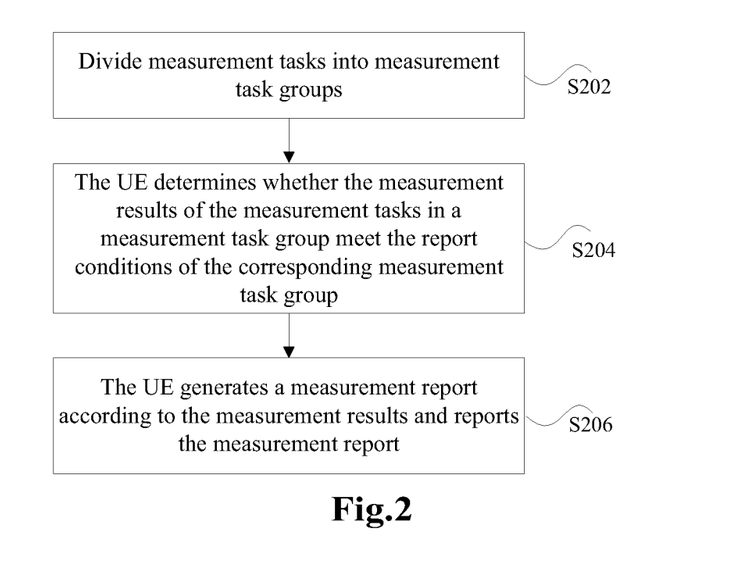
FIG. 2 is the flow chart of the method of reporting the measurement results in a multi-carrier system according to the embodiments of the present invention.

FIG. 2 is the flow chart of the method of reporting the measurement results in a multi-carrier system according to the embodiments of the resent invention, wherein the method includes:

At Step S202, the measurement tasks are divided into measurement task groups;

At Step S204, the UE determines whether the measurement results of the measurement tasks in the measurement task groups meet the report conditions corresponding to the measurement task groups;

At Step S206, the UE generates a measurement report according to the measurement results and reports the generated measurement report.

In related art, the UE adopts the strategy of immediately reporting all the measurement tasks as soon as they are triggered. This method lacks flexibility and may enhance the processing complexity of the base station and increase the system overhead. In the method provided by the present invention, all the measurement tasks are divided into measurement task groups and the measurement results in the measurement task groups are reported only under the condition that the measurement results meet the report conditions corresponding to the measurement task groups. Through this method, different report conditions can be configured according to different measurement tasks. Moreover, under the condition that proper report conditions are used, both the processing complexity of the base station and the system overhead can be reduced.

Preferably, the process that the measurement tasks are divided into measurement task groups includes one of the following methods: the network side divides the measurement tasks into measurement task groups which will be designated to the UE explicitly in the measurement control message; after receiving the measurement control message, the UE divides the measurement tasks into measurement task groups according to the preset rule. Wherein, the method that the network divides the groups and notifies the UE is more flexible, but the division conducted by the UE according to the preset rule can save the signaling interaction between the network and the UE.

Preferably, the process that the measurement tasks are divided into measurement task groups includes: put the measurement tasks, whose measurement objects are work carriers and measurement events are the same, in the same measurement task group. Through this division method, the processing of the UE end is simplified and the reporting flexibility can be enhanced by choosing different report conditions according to different groups.

Preferably, the report conditions corresponding to the measurement task group above may include: there are M measurement tasks meeting respective entry trigger conditions in a measurement task group, wherein, M<=the number of measurement tasks contained in the measurement task group. Through this report condition, the number of reports is reduced, as a result, the system overhead is reduced.

Specifically, the report conditions may include at least one of the followings:

Condition 1: a first work carrier meeting an entry trigger condition of Event A1 appears in a corresponding measurement object of the measurement tasks in the measurement task group;

Condition 2: a last work carrier meeting an entry trigger condition of Event A2 appears in a corresponding measurement object of the measurement tasks in the measurement task group.

In the measurement reporting methods in the carrier aggregation system of related art, on one hand, Event A1/A2 on each carrier may not be reported simultaneously, and the base station cannot determine whether to configure different frequency/system measurement tasks for the UE according to the measurement reports (Event A1/A2) reported by the UE like that in the LTE system, thus increasing the processing complexity of the base station; on the other hand, each carrier reports Event A1/A2 separately, as a result, comparing with the LTE system, this occupies limited air interface resource and increases system overhead.

By using the method provided by the embodiments of the present invention, by setting the measurement report condition of the group as Condition 1, the measurement report will be reported only when the first work carrier meeting the entry trigger condition of Event A1 appears in the service cell. When the work carrier meeting the entry trigger condition of Event A1 has already existed in the service cell, no report will be reported even if the UE detects other work carriers meeting the entry trigger condition of Event A1 once again, thus reducing the number of reports and further decreasing the system overhead. As soon as the carrier meeting Event A1 appears in the service cell, the measurement results will be reported to the network side which can determine to delete different frequency/system measurement tasks previously configured for the UE. Consequently, the processing complexity of the network side is reduced and the electricity is saved by stopping the different frequency/system measurement as soon as possible.

Besides, by setting the measurement report condition of the group as condition 2, the measurement report will be reported only when the last work carrier meeting the entry trigger condition of Event A2 appears, namely, the UE will report only when all the measurement tasks in this group meet Event A2. Thus the system overhead is reduced because of the reduction of reports. Under the condition that all carriers in the service cell meet Event A2, the measurement results will be reported to the network side which can determine to configure different frequency/system measurement tasks for the UE according to the results. Consequently, the processing complexity of the network side is reduced and the electricity is saved by minimizing different frequency/system measurement tasks.

In specific implementation, when the report condition is Condition 1, the process that the UE determines whether the measurement results of the measurement tasks in the measurement task groups meet the report conditions corresponding to the measurement groups can be realized by using one of the following two processing modes:

Mode 1, the UE determines that the measurement results meet the report condition when the measurement tasks whose corresponding measurement objects meet the entry trigger condition of Event A1 exist in the measurement task groups and the current value of the counter is 1, wherein, when the measurement tasks whose corresponding measurement objects meet the entry trigger condition of Event A1 exist in the measurement task groups, the value of the counter increases by 1; when the measurement tasks whose corresponding measurement objects meet the exit trigger condition of Event A1 exist in the measurement task groups, the value of the counter decreases by 1, the initial value of the counter is 0.

Mode 2, the UE determines that the measurement results meet the report condition when the measurement tasks whose corresponding measurement objects meet the entry trigger condition of Event A1 exist in the measurement task groups and the cell list of other measurement tasks in the measurement task groups does not exist.

Through the two modes above, the UE can realize the determination of the report condition easily with a small processing overhead, reduced reports, relieved processing complexity of the network side, stopping of different frequency/system measurement as soon as possible and lowered electricity consumption.

In specific implementation, when the report condition is Condition 2, the process that the UE determines whether the measurement results of the measurement tasks in the measurement task groups meet the report conditions corresponding to the measurement groups can be realized by using one of the following two processing modes:

Mode 3, the UE determines that the measurement results meet the report condition when the measurement tasks whose corresponding measurement objects meet the entry trigger condition of Event A2 exist in the measurement task groups and the current value of the counter is N, wherein, when the measurement tasks whose corresponding measurement objects meet the entry trigger condition of Event A2 exist in the measurement task groups, the value of the counter increases by 1; when the measurement tasks whose corresponding measurement objects meet the exit trigger condition of Event A2 exist in the measurement task groups, the value of the counter decreases by 1, the initial value of the counter is 0. Wherein, N refers to the total amount of the measurement tasks whose corresponding measurement event is Event A2 in the measurement task groups.

Mode 4, the UE determines that the measurement results meet the report condition when the measurement tasks whose corresponding measurement objects meet the entry trigger condition of Event A2 exist in the measurement task groups and the cell list of other measurement tasks in the measurement task groups is not empty.

Through the two modes above, the UE can realize the determination of the report condition easily with a small processing overhead, reduced reports, relieved processing complexity of the network side, rapid stopping of different frequency/system measurement as soon as possible and lowered electricity consumption.

Preferably, under the condition that the threshold of the entry condition of Event A1 is the same with that of the exit condition of Event A2, and the threshold of the exit condition of Event A1 is the same with that of the entry condition of Event A2, the process that the measurement tasks are divided into measurement task groups includes: the UE puts the measurement tasks, whose measurement objects are work carriers and trigger events are Event A1 or A2, in the same measurement task group. Under the condition that the parameter configuration of Event A1 and A2 is the same, the division modes above can be used to reduce the number of the divided groups so as to further reduce the number of reports.

In specific implementation, when the report condition is Condition 1, the process that the UE determines whether the measurement results of the measurement tasks in the measurement task groups meet the report conditions corresponding to the measurement groups can be realized by using one of the following two modes:

Mode 5, the UE determines that the measurement results meet the report condition when the measurement tasks whose corresponding measurement objects meet the entry trigger condition of Event A1 exist in the measurement task groups and the current value of the double-event counter is 1. Wherein, when the measurement tasks whose corresponding measurement objects meet the entry trigger condition of Event A1 exist in the measurement task groups, the value of the double-event counter increases by 1; when the measurement tasks whose corresponding measurement objects meet the entry trigger condition of Event A2 exist in the measurement task groups, the value of the double-event counter decreases by 1, the initial value of the double-event counter is 0.

Through the mode above, the UE can realize the determination of the report condition easily with a small processing overhead, reduced reports, relieved processing complexity of the network side, stopping of different frequency/system measurement as soon as possible and lowered electricity consumption.

In specific implementation, when the report condition is Condition 2, the process that the UE determines whether the measurement results of the measurement tasks in the measurement task groups meet the report conditions corresponding to the measurement groups can be realized by using one of the following two modes:

Mode 6, the UE determines that the measurement results meet the report condition when the measurement tasks whose corresponding measurement objects meet the entry trigger condition of Event A2 exist in the measurement task groups and the current value of the double-event counter is 0. Wherein, when the measurement tasks whose corresponding measurement objects meet the entry trigger condition of Event A1 exist in the measurement task groups, the value of the double-event counter increases by 1; when the measurement tasks whose corresponding measurement objects meet the entry trigger condition of Event A2 exist in the measurement task groups, the value of the double-event counter decreases by 1, the initial value of the double-event counter is 0.

Through the mode above, the UE can realize the determination of the report condition easily with a small processing overhead, reduced reports, relieved processing complexity of the network side, stopping of different frequency/system measurement as soon as possible and lowered electricity consumption.

Preferably, the process that the measurement tasks are divided into measurement task groups includes: put the measurement tasks, whose measurement objects are work carriers measurement events are comparative events, event types are the same and comparative reference cells are different service cells, in the same measurement task group. Through this division method, the processing of the UE end is simplified and the reporting flexibility can be enhanced by choosing different report conditions according to different groups.

Preferably, the report conditions may include: M measurement tasks corresponding to one cell on the measurement objects in the measurement task group meet the trigger conditions, wherein, M<=the quantity of the measurement tasks in the measurement task group.

Specifically, the report conditions may include at least one of the following:

Condition 3: in relation to a reference cell of a respective measurement task, one adjacent cell of a measurement object corresponding to one measurement task in the measurement task group meets an entry trigger condition of a comparative event;

Condition 4: in relation to respective reference cells of each measurement task of all measurement tasks, a same adjacent cell of measurement objects corresponding to all measurement tasks in the measurement task group meets an entry trigger condition of a comparative event;

Condition 5: in relation to a reference cell of a respective measurement task, one adjacent cell of a measurement object corresponding to the measurement task in the measurement task group meets an exit trigger condition of a comparative event; and Condition 6: in relation to respective reference cells of each measurement task of all measurement tasks, a same adjacent cell of measurement objects corresponding to all measurement tasks in the measurement task group meets an exit trigger condition of a comparative event.

Wherein, the comparative event refers to Event A3 or A5.

In related art, the UE in the carrier aggregation can work on several carriers, namely, the UE can work on several service cells. An adjacent cell will trigger different measurement reports in relation to different service cells. On one hand, since these measurement reports may not be reported simultaneously, the base station cannot conduct a reasonable switching determination according to one measurement report like that in the LTE system; on the other hand, the trigger of too many measurement reports will occupy the limited air interface resource, and further increase the system overhead.

In the method provided by this embodiment, through setting the report condition of the group as Condition 3, the measurement report will be reported only under the condition that one adjacent cell on the measurement objects corresponding to one measurement task in the measurement task group meets the entry trigger condition of the comparative events in relation to the reference cell of the measurement task, or it will not be reported; and/or as Condition 5, the measurement report will be reported only under the condition that one adjacent cell on the measurement objects corresponding to one measurement task in the measurement task group meets the exit trigger condition of the comparative events in relation to the reference cell of the measurement task, or it will not be reported. Thus, the reporting amount is reduced and the system overhead is further decreased. Besides, since in the carrier aggregation, the comparative event between the aggregative carrier (namely all the aggregative carriers which can be configured to the UE apart from the work carriers configured for the UE) and the work carriers, and the comparative event between work carriers are used to provide bases for the carrier management (including the increase, deletion of the work carrier for the UE, replacement of the configured work carriers by using the carriers which have not been configured, and the change of the major carrier) of the network side, the measurement report will be reported under the condition that the measurement object meets the entry (Event A3) trigger condition and exit (Event A5) trigger condition. The base station can conduct the carrier management decision timely according to the measurement report to meet the high data transmission rate demand of the UE in the carrier aggregation.

By setting the measurement report condition in the group as Condition 4, the measurement report will be reported only under the condition that the same adjacent cell on the measurement objects corresponding to all the measurement tasks in the measurement task group meets the entry trigger condition of the comparative events in relation to the reference cell of every measurement task in the measurement task group, or it will not be reported; and/or as Condition 6, the measurement report will be reported only under the condition that the same adjacent cell on the measurement objects corresponding to all the measurement tasks in the measurement task group meets the exit trigger condition of the comparative events in relation to the reference cell of every measurement task in the measurement task group, or it will not be reported. As a result, the system overhead is decreased because of the reduction of the reporting amount. Moreover, since the comparative events are used to provide bases for the switching determination of the network side, the amount of switching can be reduced through adopting Condition 4, as a result, the switching processing overhead of the system is reduced. Besides, by adopting Condition 6, the base station can conduct switching determination better.

In specific implementation, when the report condition is Condition 3, the process that the UE determines whether the measurement results of the measurement tasks in the measurement task groups meet the report conditions corresponding to the measurement groups can be realized by using one of the following modes:

Mode 7, the UE determines that the measurement result meets the report condition when one adjacent cell on the measurement objects corresponding to one measurement task in the measurement task group meets the entry trigger condition of the comparative events in relation to the reference cell of the measurement task, and the cell list of the other measurement tasks in the measurement task group does not exist or the adjacent cell does not exist in the cell list. Through this method, the reporting amount can be reduced.

In specific implementation, when the report condition is Condition 4, the process that the UE determines whether the measurement results of the measurement tasks in the measurement task groups meet the report conditions corresponding to the measurement groups can be realized by using one of the following modes:

Mode 8, the UE determines that the measurement result meets the report condition when one adjacent cell on the measurement objects corresponding to one measurement task in the measurement task group meets the entry trigger condition of the comparative events in relation to the reference cell of the measurement task and the adjacent cell exists in the cell lists of all the measurement task in the measurement task group. Through this method, both the reporting amount and the switching processing overhead of the system can be reduced.

In specific implementation, when the report condition is Condition 5, the process that the UE determines whether the measurement results of the measurement tasks in the measurement task groups meet the report conditions corresponding to the measurement groups can be realized by using one of the following modes:

Mode 9, the UE determines that the measurement result meets the report condition when one adjacent cell on the measurement objects corresponding to one measurement task in the measurement task group meets the exit trigger condition of the comparative events in relation to the reference cell of the measurement task and the cell list of other measurement tasks in the measurement task group does not exist or the adjacent cell does not exist in the cell list. Through this method, the base station can conduct the carrier management decision timely according to the measurement report to meet the high data transmission rate demand of the UE in the carrier aggregation.

In specific implementation, when the report condition is Condition 6, the process that the UE determines whether the measurement results of the measurement tasks in the measurement task groups meet the report conditions corresponding to the measurement groups can be realized by using one of the following modes:

Mode 10, the UE determines that the measurement result meets the report condition when one adjacent cell on the measurement objects corresponding to one measurement task in the measurement task group meets the exit trigger condition of the comparative events in relation to the reference cell of the measurement task and the adjacent cell exists in the cell lists of all the measurement task in the measurement task group. Through this method, the reporting amount can be reduced.

Figure 3:
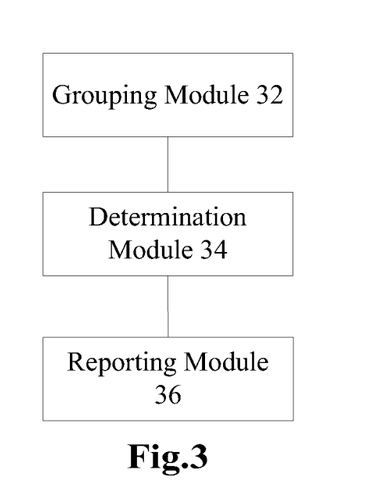
FIG. 3 is the block diagram of the user equipment according to the embodiments of the present invention.

FIG. 3 is the block diagram of the UE structure according to the embodiments of the present invention, wherein the UE includes:

a grouping module 32, configured to divide the measurement tasks into measurement task groups;

a determination module 34, coupled to the grouping module 32 and configured to determine whether the measurement results of the measurement tasks in the measurement task group meet the report condition of the corresponding measurement task groups;

a reporting module 36 coupled to the determination module 34 and configured to report the measurement report generated according to the measurement result under a positive condition that the determination result is "yes".

In related art, the UE adopts the strategy of immediately reporting of all the measurement tasks as soon as they are triggered. This method lacks flexibility and may add the processing complexity of the base station and increase the system overhead. In the user equipment provided by the present invention, all the measurement tasks are divided into measurement task groups by the grouping module 32 and the measurement results are reported by the reporting module 36 only under the condition that the measurement results in the measurement task groups are determined to meet the report conditions corresponding to the measurement task groups by the determination module 34. Through this method, different report conditions can be configured according to different measurement tasks; moreover, under the condition that proper report conditions are used, both the processing complexity of the base station and the system overhead can be reduced. Besides, the division conducted by the grouping module 32 of the UE can save the signaling interaction between the network side and the UE.

Figure 9:
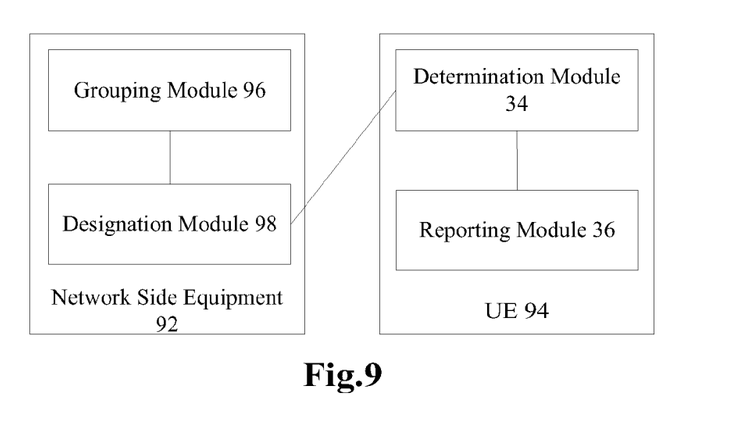
FIG. 9 is the block diagram of the reporting system structure of the measurement results in a multi-carrier system according to the embodiments of the present invention.

FIG. 9 is the block diagram of the reporting system structure of the measurement results in a multi-carrier system according to the embodiments of the present invention, comprising network side equipment 92 and UE 94. Wherein the network side equipment 92 includes, a grouping module 96, configured to divide the measurement tasks into measurement task groups; a designation module 98 coupled to the grouping module 96, configured to explicitly designate the measurement task group to the UE in the measurement control message; wherein the UE 94 includes, a determination module 34 coupled to the designation module 98, configured to determine whether the measurement results of the measurement tasks in the measurement task groups meet the report conditions corresponding to the measurement task groups; a reporting module 36 coupled to the determination module 34, configured to generate the measurement report according to the measurement result under the condition that the determination result of the determination module 34 is "yes" and report the measurement report.

Through this system, the grouping module 96 of the network side divides all the measurement tasks into measurement task groups which will be designated to the UE by the designation module 98; the UE will report the measurement result through the reporting module 36 only under the condition that the determination module 34 of the UE determines the measurement result meets the report condition corresponding to this group, and different report conditions can be configured to different groups to make the measurement reporting more flexible, and reduce both the processing complexity of the base station and the system overhead under the condition that proper report conditions are adopted.

Figure 4:
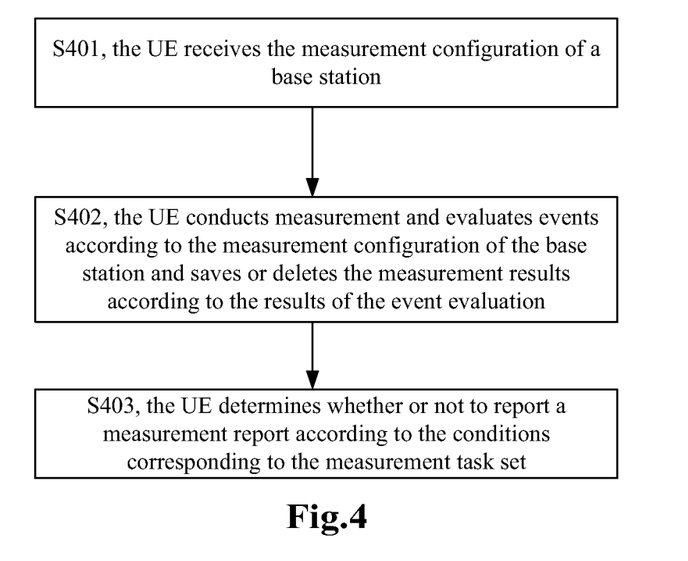
FIG. 4 is the detailed flow chart of the method of reporting the measurement results in a multi-carrier system according to the embodiments of the present invention.

FIG. 4 is the detailed flow chart of the method of reporting the measurement results in a multi-carrier system according to the embodiments of the present invention; as shown in FIG. 4, comprising the following steps:

At S401, the UE receives the measurement configuration of the base station, wherein the measurement configuration includes the two measurement tasks configured for each work carrier (also called the service cell, hereinafter refers to the same with this explanation) which is working with the UE as the base station, the measurement events of the report configuration of these two measurement tasks are A1 and A2. The measurement configuration may also include the configuration of measurement tasks to the UE by the base station, wherein the measurement objects of the measurement tasks are adjacent carriers, the measurement events of the report configuration configured to the measurement tasks are Event A3 and/or Event A5.

Figure 5:
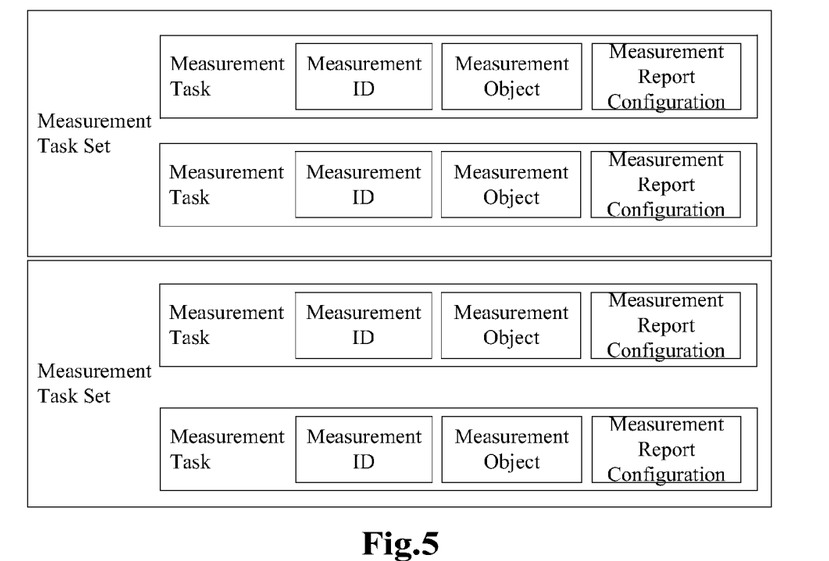
FIG. 5 is the schematic diagram of the measurement task set according to the embodiments of the present invention.

FIG. 5 is the schematic diagram of the measurement task set according to the embodiments of the present invention. The base station designates the measurement task set (namely, the group above) through explicit configuration in the measurement configuration or the base station and the UE designate the measurement task set according to the implicit rule in accordance with the protocol. For example, all the measurement tasks corresponding to Event A1 belong to a measurement task set, all the measurement tasks corresponding to Event A2 belong to another measurement task set, or the measurement tasks corresponding to Event A1 and A2 form a measurement task set, or Event A3 of an adjacent carrier (measurement object) in relation to different service cell form a measurement task set, or Event A5 of an adjacent carrier (measurement object) in relation to different service cell form a measurement task set.

At S402, the UE conducts the measurement and event evaluation according to the measurement configuration of the base station, and saves or deletes the measurement result according to the result of the event evaluation, specifically, the UE measures the work carrier and conducts A1, A2 event evaluation to the measurement result according to the measurement tasks configured to each work carrier by the base station. The UE measures the adjacent carrier and conducts event evaluation to the measurement result according to the measurement event (A3 or A5) configured in accordance with the measurement tasks configured for each adjacent carrier by the base station.

When the UE determines that the measurement results of a cell meet the entry condition of the configured measurement event of the measurement tasks configured on the carrier where the cell is placed within the TTT time according to the event evaluation result and the cell has not been saved in the cell list of the corresponding measurement tasks, the UE determines the signal quality of this cell meets the event-entry trigger condition and saves this cell and its measurement result in a cell list identified with the MID of the corresponding measurement task. Or, when the UE determines that the measurement results of a cell meet the exit condition of the configured measurement event of the measurement tasks configured on the carrier where the cell is placed within the TTT time according to the event evaluation result and the cell has not been saved in the cell list of the corresponding measurement tasks, the UE determines the signal quality of this cell meets the event-exit trigger condition and deletes this cell and its measurement result from the cell list, and simultaneously, the UE determines whether the cell list is empty after the deletion, if it is, the UE deletes the cell list locally.

Figure 6:
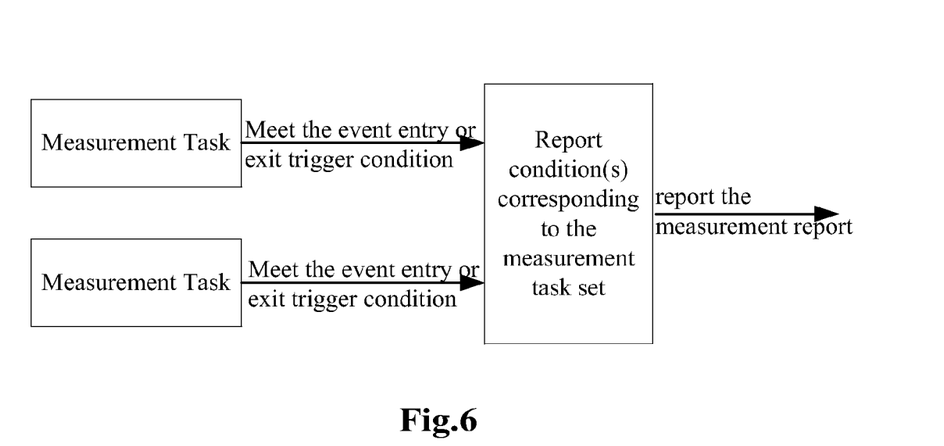
FIG. 6 is the schematic diagram when the UE in the embodiments of the present invention determines whether to report the measurement report in accordance with the conditions corresponding to the measurement task set.

At S403, if the measurement task meeting the event-entry trigger condition belongs to the measurement task set configured according to S401, the UE determines whether to report the measurement report according to the conditions corresponding to the measurement task set. As shown in FIG. 6, when the UE determines the signal quality of the N-th carrier in the measurement task set meets the entry or exit trigger condition of the event, it will determine whether to report the measurement report according to the condition corresponding to the measurement task set in accordance with the event evaluation result of S402.

In the condition above, when the measurement event configured for the report configuration by the measurement task set is Event A1, and N is equal to 1: the UE will report the measurement report only when the signal quality of the first work carrier meets the entry trigger condition of Event A1, or it will not report the measurement report.

In the condition above, when measurement event configured for the report configuration by the measurement task set is Event A2 and N refers to the number of the work or activated carriers: the UE will report the measurement report only when the signal quality of the last work or activated carrier meets the entry trigger condition of Event A2, or it will not report the measurement report.

In the condition above, when the measurement event configured for the report configuration by the measurement task set is Event A3/A5 and N is equal to 1: the UE will report the measurement report only when an adjacent cell meets the entry trigger condition of Event A3/A5 in relation to the service cell, or it will not report the measurement report.

In the condition above, when the measurement task whose measurement event configured for the report configuration by the measurement task set is Event A3/A5, and N refers to the number of the work or activated carriers: the UE will report the measurement report only when an adjacent cell meets the entry trigger condition of Event A3/A5 in relation to all the service cells, or it will not report the measurement report.

The measurement report above may include the signal qualities of all the work carriers.

The following is the description of the process that the UE determines whether to submit the measurement report through the preferred embodiments.

The UE is working on two component carriers currently: component carrier 1 (CC1) and component carrier 2 (CC2); component carrier 3 (CC3) is the adjacent carrier, wherein the base station configures two measurement tasks for CC1 and CC2 respectively.

Figure 7:
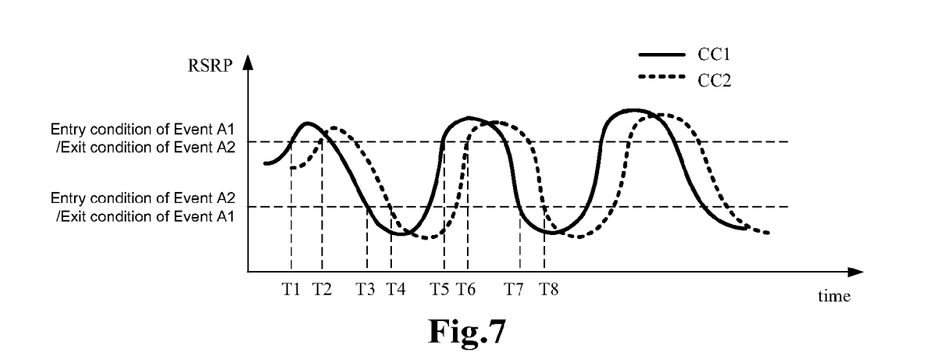
FIG. 7 is the schematic diagram of the signal quality change of the work carrier (service cell) according to the embodiments of the present invention.

Measurement task 1 (MID1): the measurement object is CC1, and the measurement event configured by the report configuration is Event A1;

Measurement task 2 (MID2): the measurement object is CC1, and the measurement event configured by the report configuration is Event A2;

Measurement task 3 (MID3): the measurement object is CC2, and the measurement event configured by the report configuration is Event A1;

Measurement task 4 (MID1): the measurement object is CC2, and the measurement event configured by the report configuration is Event A2;

The base station configures two measurement tasks for CC3;

Measurement task 5 (MID5): the measurement object is CC3, the measurement event configured by the report configuration is Event A3, and the service cell compared with Event A3 is the service cell on CC1;

Measurement task 6 (MID6): the measurement object is CC3, the measurement event configured by the report configuration is Event A3, the service cell compared with Event A3 is the service cell on CC2;

For simplicity, according to the two dotted lines drawn on the vertical axis parallel to the horizontal axis in FIG. 7, in case of the parameters configured for Event A1 and A2 in the measurement tasks above are the same, namely, the threshold configuration of the entry condition of Event A1 and the exit condition of Event A2 is the same, and the corresponding threshold configuration of the exit condition of Event A1 and the entry condition of Event A2 is the same, they can also be configured to be different during the actual implementation.

Preferred Embodiment 1

In this embodiment, the process is described that the UE determines that the measurement result of the group meets the measurement report condition of the corresponding group by Mode 1 or Mode 3 when the measurement report condition is Condition 1 or Condition 2.

The UE configures a counter C-A1 for all the measurement tasks, whose measurement objects are work carriers and measurement events configured by the report configuration are Event A1 (namely, MID1 and MID3 belong to the same measurement task set), wherein the initial value of C-A1 is 0 and the maximum value is the total quantity of the measurement tasks whose measurement events configured by the report configuration are Event A1, in this embodiment, it is 2. The UE configures a counter C-A2 for all the measurement tasks, whose measurement objects are work carriers and measurement events configured by the report configuration are Event A2 (namely, MID2 and MID4 belong to the same measurement task set), wherein the initial value of C-A2 is 0 and the maximum value is the total quantity of the measurement tasks whose measurement events configured by the report configuration are Event A2, in this embodiment, it is 2.

Specifically, the counting method of C-A1 is, when there are work carriers whose signal quality meets the entry trigger condition of Event A1, the value of the counter C-A1 increases by 1; when there are work carriers whose signal quality meets the exit trigger condition of Event A1, the value of the counter C-A1 decreases by 1.

The condition that the UE reports Event A1 on the work carriers is that the UE reports the measurement report only when there is a work carrier whose signal quality meets the entry trigger condition of Event A1 and the value of the counter C-A1 is 1, or it will not report the measurement report.

The condition that the UE reports Event A2 on the work carriers is that the UE reports the measurement report only when there are work carriers whose signal quality meets the entry trigger condition of Event A1 and the value of the counter C-A1 is its maximum value (in this embodiment, it is 2), or it will not report the measurement report.

FIG. 7 is the schematic diagram of the signal quality change of the work carrier according to the embodiments of the present invention. The maintenance states of each cell list and the values of the counter C-A1 and C-A2 at each moment are given in Table 1, wherein "✓" indicates that the work carriers configured for the corresponding tasks and their measurement results are saved in the corresponding cell lists at the corresponding moments, "×" indicates that the work carriers configured for the corresponding tasks and their measurement results are not saved in the corresponding cell lists at the corresponding moments, namely the cell lists of the corresponding tasks at the corresponding moments are not saved locally.

carriers in this embodiment, then the UE reports the measurement report which can include the measurement results of all the work carriers to the base station.

According to the measurement report condition in this embodiment, the UE is required to report the measurement report of Event A1 to the base station at T1 and T5, and report the measurement report of Event A2 to the base station at T4 and T8. The base station can configure/delete the different frequency and different system measurement tasks configured for the UE according to the measurement report of Event A1/A2 reported by the UE and other RRM algorithms.

Preferred Embodiment 2

This embodiment is only applicable to the condition that the configured parameters of Event A1 and A2 are the same. At this time, MID1, MID2, MID3 and MID4 belong to the

TABLE 1

|  |  | T1 | T2 | T3 | T4 | T5 | T6 | T7 | T8 |
|---|---|---|---|---|---|---|---|---|---|
| Event A1 | Cell list of Measurement Task 1 | ✓ (CC1 meets the entry condition) | ✓ | x | x | ✓ (CC1 meets the entry condition) | ✓ | x | x |
|  | Cell list of Measurement Task 3 | x | ✓ (CC2 meets the entry condition) | ✓ | x | x | ✓ (CC2 meets the entry condition) | ✓ | x |
|  | C-A1 | 1 | 2 | 1 | 0 | 1 | 2 | 1 | 0 |
| Event A2 | Cell list of Measurement Task 2 | x | x | ✓ (CC1 meets the entry condition) | ✓ | x | x | ✓ (CC1 meets the entry condition) | ✓ |
|  | Cell list of Measurement Task 4 | x | x | x | ✓ (CC2 meets the entry condition) | ✓ | x | x | ✓ (CC2 meets the entry condition) |
|  | C-A2 | 0 | 0 | 1 | 2 | 1 | 0 | 1 | 2 |
|  | Counter | 1 | 2 | 1 | 0 | 1 | 2 | 1 | 0 |

Moment T1 and Moment T4 will be taken as examples for making a description of Table 1 hereinafter.

At Moment T1, when the UE determines that the signal quality of CC1 meets the entry trigger condition of Event A1 configured for the measurement task 1, it saves CC1 and its measurement result in the cell list identified with MID1 of the measurement task 1 and increases the value of the counter by 1. When the UE simultaneously determines the measurement report of Event A1 requiring reporting according to the report condition of Event A1 on the work carriers in this embodiment, it reports the measurement report which can include the measurement results of all the work carriers to the base station.

At Moment T4, when the UE determines that the signal quality of CC2 meets the exit trigger condition of Event A1 configured for the measurement task 3, it deletes CC2 and its measurement result from the cell list identified with MID3 of the measurement task 3 and decreases the value of the counter C-A1 by 1. Since the configured parameters of Event A1 and A2 are the same in this embodiment, when the UE determines that the signal quality of CC2 meets the entry trigger condition of Event A2 configured for the measurement task 4, it saves CC2 and its measurement result in the cell list identified with MID4 of the measurement task 4 and increases the value of the counter C-A2 by 1. The UE simultaneously determines the measurement report of Event A2 requiring reporting according to the report condition of Event A2 on the work same measurement task set. The process is described hereinafter that the UE determines whether the measurement results of the measurement tasks in the group to meet the measurement report condition of the corresponding group by Mode 5 or 6 when the measurement report condition of the group is Condition 1.

In this embodiment, the UE configures a counter for all the measurement tasks, whose measurement objects are work carriers and measurement events configured by the report configuration are Event A1 or A2, wherein the initial value of the counter is 0 and the maximum value is the total quantity of the measurement tasks whose measurement events configured by the report configuration are Event A1 (or Event A2), in this embodiment, it is 2.

The counting method of the counter is, when there are work carriers whose signal quality meets the entry trigger condition of Event A1, the value of the counter increases by 1; when there are work carriers whose signal quality meets the entry trigger condition of Event A2, the value of the counter decreases by 1.

The condition that the UE reports Event A1 on the work carriers is that the value of the counter is 1 when there is a work carrier whose signal quality meets the entry trigger condition of Event A1.

The condition that the UE reports Event A2 on the work carriers is that the value of the counter is 0 when there is a work carrier whose signal quality meets the entry trigger condition of Event A2.

Table 1 shows the values of the counter at each moment in this embodiment. According to the measurement report condition in this embodiment, the UE is required to report the measurement report of Event A1 to the base station at T1 and T5, and report the measurement report of Event A2 to the base station at T4 and T8. The base station can configure/delete the different frequency and different system measurement tasks configured for the UE according to the measurement report of Event A1/A2 reported by the UE and other RRM algorithms.

Preferred Embodiment 3

In this embodiment, the process is described that the UE determines that the measurement results of the measurement tasks in the group meet the measurement report condition of the corresponding group by Mode 2 and 4 when the measurement report condition of the group is Condition 1 or 2.

In this embodiment, MID1 and MID3 belong to a measurement task set called measurement task set 1, MID2 and MID4 belong to a measurement task set called measurement task set 2. The UE conducts A1/A2 event evaluation to the measurement results of CC1 and CC2 and saves the work carriers meeting the entry trigger condition of Event A1/A2 in the cell lists of the corresponding measurement tasks according to the results of the event evaluation, or deletes the work carriers meeting the entry trigger condition of Event A1/A2 from the cell lists of the corresponding measurement tasks according to the results of the event evaluation. Table 1 gives the maintenance states of each cell of the UE at each moment based on the schematic diagram of signal quality change of the work carrier shown in FIG. 7.

In this embodiment, the condition that the UE reports Event A1 on the work carriers is that the UE reports the measurement report only when there is a work carrier whose signal quality meets the entry trigger condition of Event A1 and the cell lists of all the other measurement tasks, whose measurement objects are work carriers and measurement event configured by the report configuration is Event A1, are not saved, namely the cell list of other measurement tasks in the measurement task set 1 are not saved, or the UE will not report the measurement report.

The condition that the UE reports Event A2 on the work carriers is that the UE reports the measurement report when only there is a work carrier whose signal quality meets the entry trigger condition of Event A2 and the cell lists of all the other measurement tasks, whose measurement objects are work carriers and measurement event configured by the report configuration is Event A2, are saved, namely the cell list of other measurement tasks in the measurement task set 2 are saved, or the UE will not report the measurement report.

According to the states of the cell lists of the UE at each moment shown in Table 1, in this embodiment, the UE is required to report the measurement report of Event A1 to the base station at T1 and T5, and report the measurement report of Event A2 to the base station at T4 and T8. The base station can configure/delete different frequency and different system measurement tasks configured for the UE according to the measurement report of Event A1/A2 reported by the UE and other RRM algorithms.

Preferred Embodiment 4

In this embodiment, the process is described that the UE determines that the measurement results of the measurement tasks in the group meet the measurement report condition of the corresponding group by Mode 7 when the measurement report condition of the group is Condition 3; and/or the UE determines that the measurement results of the measurement tasks in the group meet the measurement report condition of the corresponding group by Mode 9 when the measurement report condition of the group is Condition 5.

In this embodiment, the UE conducts A3 event evaluation to the measurement result of CC3 which is the measurement object of MID5 and MID6, wherein the MID5 and MID6 belong to the same measurement task set and have the same report configuration trigger type—Event A3, and different reference service cells—CC1 and CC2. The report condition used by the measurement task set is that, when the measurement task of an adjacent cell meets the entry trigger condition of Event A3 in relation to a reference service cell and the cell lists of other measurement tasks in the measurement task group are determined to be nonexistent in the adjacent cell or the adjacent cell is determined to be nonexistent in the cell list (namely Mode 7, Condition 3), report will be made, or it will not, namely, report is made only when the first service cell meets the entry trigger condition of Event A3 for an adjacent cell. The reference service cell refers to the service cell compared with Event A3, so similarly, Event A5 can use the same method.

Preferably, to better assist the base station to conduct carrier management, on the basis of Condition 3, the report condition used by the measurement task set can be configured according to the exit trigger condition of Event A3, namely when there is an adjacent cell in the cell lists of the measurement tasks in the measurement task set meeting the exit trigger condition of Event A3 and the cell lists of the other measurement tasks in the measurement task set are determined to be nonexistent or the adjacent cell is determined to be nonexistent in the cell list (namely Mode 9, Condition 5), report will be made, or it will not, namely only when there is an adjacent cell in the cell lists of all or part of the measurement tasks in the measurement task set meeting the exit trigger condition of Event A3 of all or part of measurement tasks, report is made, or it will not.

Figure 8:
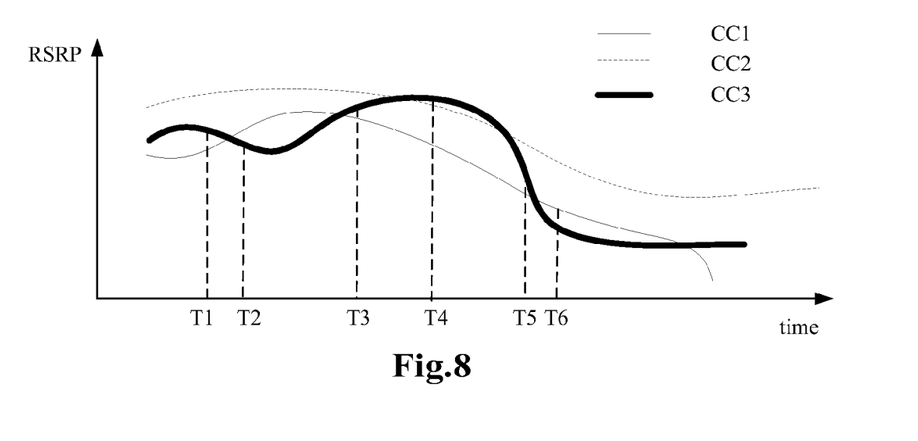
FIG. 8 is the schematic diagram of the signal quality change of the adjacent carrier according to the embodiments of the present invention.

As shown in FIG. 8, the signal quality of the CC3 is an offset better than that of the CC1 at T1 and the entry trigger condition of Event A3 corresponding to the MID5 is met. The UE saves the CC3 and its measurement results in the cell list corresponding to the MID5 and inspects the cell list of the MID6 which is in the same measurement task set. At this time, the signal quality of the CC2 is much better than that of the CC3, so the cell list does not exist in the MID6 or the CC3 does not exist in the cell list. The UE reports the measurement report. At T2, the signal quality of the CC3 is worse than that of the CC1 once again and the exit trigger condition corresponding to Event A3 is met. The UE deletes the CC3 and its measurement results from the cell list corresponding to the MID5, preferably, the UE detects the inexistence of the cell list in the MID6 or the CC3 in the cell list, and then it reports the measurement report. At T3, similar to the analysis at T1, the UE meets the entry trigger condition of Event A3 corresponding to the MID5 once again, then it reports the measurement report of the CC3. At T4, the CC3 meets the entry trigger condition of Event A3 corresponding to the MID6. At this time, the CC3 has been saved in the cell list corresponding to the MID5, so the measurement report will not be reported at T4. At T5, the signal quality of the CC3 is worse than that of the CC2 again. At this time, the exit trigger condition of the corresponding Event A3 is met, then the UE deletes the CC3 and its measurement results from the cell list corresponding to the MID6. At T6, the signal quality of the CC3 is worse than that of the CC1 and the exit trigger condition of the corresponding Event A3 is met, then the UE deletes the CC3 and its measurement results from the cell list corresponding to the MID5, preferably, the UE detects the inexistence of the cell list in the MID5 and the CC3 in the cell list, then it reports the measurement report.

The base station can conduct carrier management according to the measurement report of Event A3 reported by the UE and other RRM algorithms, for example, at T1 and T3, the base station can add (configure) the CC3 to the UE so that it becomes the work carrier of the UE; at T2 and T6, the base station can delete the CC3 from the work carriers of the UE.

Preferred Embodiment 5

In this embodiment, the process is described that the UE determines whether the measurement results of the measurement tasks in the group meet the measurement report condition of the corresponding group by Mode 8 when the measurement report condition of the group is Condition 4; and/or the UE determines the measurement results of the measurement tasks in the group meet the measurement report condition of the corresponding group by Mode 10 when the measurement report condition of the group is Condition 6.

In this embodiment, the UE conducts A3 event evaluation to the measurement result of the CC3 which is the measurement object of the MID5 and MID6, wherein they belong to the same measurement task set and have the same report configuration trigger type—Event A3, and different reference service cells—CC1 and CC2. The report condition used by the measurement task set is that, when the measurement task of an adjacent cell meets the entry trigger condition of Event A3 in relation to a reference service cell and the cell lists of all the measurement tasks in the measurement task set are determined to exist (namely Mode 7, Condition 4), report will be made, or it will not, namely, report is made only when all the service cells meet the entry trigger condition of Event A3 for an adjacent cell. The reference service cell refers to the service cell compared with Event A3, so similarly, Event A5 can use the same method.

Preferably, to better assist the base station to conduct carrier management, on the basis of Condition 4, the report condition used by the measurement task set can be configured according to the exit trigger condition of Event A3, namely, when there is an adjacent cell in the cell lists of the measurement tasks in the measurement task set meeting the exit trigger condition of Event A3 and the cell lists of all the measurement tasks in the measurement task set are determined to exist (namely Mode 10, Condition 6), report will be made, or it will not, namely, report is made only when there is an adjacent cell in the cell lists of all the measurement tasks in the measurement task set meeting the exit trigger condition of Event A3 of a measurement task, or it will not.

As shown in FIG. 8, the signal quality of the CC3 is an offset better than that of the CC1 at T1 and the entry trigger condition of Event A3 corresponding to the MID5 is met. The UE saves CC3 and its measurement results in the cell list corresponding to the MID5 and inspects the cell list of the MID6 which is in the same measurement task set with the MID5. At this time, the signal quality of the CC2 is much better than that of the CC3, so the cell list does not exist in the MID6 or the CC3 does not exist in the cell list, then the UE reports the measurement report. At T2, the signal quality of the CC3 is worse than that of the CC1 once again. At this time, the exit trigger condition corresponding to Event A3 is met. The UE deletes the CC3 and its measurement results from the cell list corresponding to the MID5. At T3, similar to the analysis at T1, the UE meets the entry trigger condition of Event A3 corresponding to the MID5 once again and still does not report the measurement report of the CC3. At T4, the CC3 meets the entry trigger condition of Event A3 corresponding to the MID6. At this time, the CC3 has been saved in the cell list corresponding to the MID5, so the measurement reported will not be reported at T4. At T5, the signal quality of the CC3 is worse than that of the CC2 again. At this time, the exit trigger condition of the corresponding Event A3 is met, then the UE deletes the CC3 and its measurement results from the cell list corresponding to the MID6. At T6, the signal quality of the CC3 is worse than that of the CC1. At this time, the exit trigger condition of the corresponding Event A3 is met, then the UE deletes the CC3 and its measurement results from the cell list corresponding to the MID5, preferably, the UE detects the inexistence of the cell list in the MID5 and the CC3 in the cell list, then it reports the measurement report.

The base station can conduct the switching determination according to the measurement report of Event A3 reported by the UE and other RRM algorithms, for example, at T4, the base station can switch the UE to the CC3. If the base station has not switched the UE to the CC3 at T4, after T6, the base station determines that the CC3 is not the proper alternative switching cell and cannot switch the UE to the CC3 again.

It shall be noted that, for the simplicity of the description of all the embodiments above, the measurement result of the CC1 refers to the measurement result of the service cell when the UE is on the CC1, the measurement result of the CC2 refers to the measurement result of the service cell when the UE is on the CC2, and the measurement result of the CC3 refers to the measurement result of an adjacent cell on the CC3.

To sum up, the solution provided by the embodiments above can reduce the amount of the measurement report and the system overhead, and simultaneously the base station can directly use the measurement reports reported by the UE to determine whether to configure different frequency/system measurement or conduct the switching, as a result, the processing complexity of the base station is reduced.

It shall be noted that the steps shown in the flow chart of the drawings can be carried out in a computer system, such as a series of computer-executable commands, although the logic sequence is shown in the flow chart, in some circumstances, the steps described or shown herein can be conducted in different sequences.

It is obvious for the person skilled in this art that, the modules or steps of the present invention can be also realized by a general computer device. They can be integrated in a single computer device or distributed on the network composed of several computer devices, or alternatively achieved by executable codes of a computer device, so as to store them in a storage unit for execution by a computer device, or make them into different integrated circuit modules or make multiple modules or steps of them to a single integrated circuit module for realization of the present invention. In this way, the present invention is not restricted to the combination of any specific hardware and software.

Above description is only to illustrate the preferred embodiments but not to limit the present invention, which is subject to alteration and change for the person skilled in this art. Any such change, equivalent substitution or improvement made within the spirit and principle of the present invention should be covered in the scope of protection of the present invention.

What is claimed is:

1. A method for reporting measurement results in a multi-carrier system, comprising:
    dividing measurement tasks into measurement task groups;
    a UE determining whether measurement results of respective measurement tasks in one of the measurement task groups meet a report condition of the corresponding measurement task group;
    the UE generating a measurement report according to the measurement results; and the UE reporting the measurement report.

2. The method according to claim 1, wherein the process of dividing the measurement tasks into measurement task groups includes:
a network side equipment dividing the measurement tasks into measurement task groups and designating them to the UE explicitly in a measurement control message; or
the UE dividing the measurement tasks into the measurement task groups according to a preset rule after receiving the measurement control message.

3. The method according to claim 1, wherein the process of dividing the measurement tasks into measurement task groups includes:
putting measurement tasks whose measurement objects are work carriers and that have same measurement events into one measurement task group.

4. The method according to claim 3, wherein the report condition includes:
there are M measurement tasks meeting respective entry trigger conditions in a measurement task group, wherein, M<=the number of measurement tasks contained in the measurement task group.

5. The method according to claim 4, wherein the report condition includes:
Condition 1: a first work carrier meeting an entry trigger condition of Event A1 appears in a corresponding measurement object of the measurement tasks in the measurement task group; and/or
Condition 2: a last work carrier meeting an entry trigger condition of Event A2 appears in a corresponding measurement object of the measurement tasks in the measurement task group.

6. The method according to claim 5, wherein, the report condition is Condition 1, the process that the UE determines whether measurement results of measurement tasks in a measurement task group meet the report condition of the corresponding measurement task group includes:
the UE determines that the measurement results meet the report condition if the measurement tasks whose corresponding measurement objects meet the entry trigger condition of Event A1 exist in the measurement task group and a current value of a counter is 1, wherein, when the measurement tasks whose corresponding measurement objects meet an entry trigger condition of Event A1 exist in the measurement task groups, a value of the counter increases by 1; when the measurement tasks whose corresponding measurement objects meet an exit trigger condition of Event A1 exist in the measurement task group, the value of the counter decreases by 1; an initial value of the counter is 0; or
the UE determines that the measurement results meet the report condition if the measurement tasks whose corresponding measurement objects meet the entry trigger condition of Event A1 exist in the measurement task group and a cell list of other measurement tasks in the measurement task group does not exist.

7. The method according to claim 5, wherein, the report condition is Condition 2, the process that the UE determines whether measurement results of measurement tasks in a measurement task group meet the report condition of the corresponding measurement task group includes:
the UE determines that the measurement results meet the report condition if the measurement tasks whose corresponding measurement objects meet the entry trigger condition of Event A2 exist in the measurement task group and a current value of a counter is N, wherein, when the measurement tasks whose corresponding measurement objects meet the entry trigger condition of Event A2 exist in the measurement task group, the value of the counter increases by 1; when the measurement tasks whose corresponding measurement objects meet an exit trigger condition of Event A2 exist in the measurement task group, the value of the counter decreases by 1; an initial value of the counter is 0, N refers to a total number of measurement tasks whose corresponding measurement event is Event A2 in the measurement task group; or
the UE determines that the measurement results meet the report condition if the measurement tasks whose corresponding measurement objects meet the entry trigger condition of Event A2 exist in the measurement task group and a cell list of other measurement tasks in the measurement task group is not empty.

8. The method according to claim 1, wherein, an entry condition threshold of Event A1 is the same as an exit condition threshold of Event A2 and an exit condition threshold of Event A1 is the same as an entry condition threshold of Event A2, dividing the measurement tasks into measurement task groups includes:
the UE putting the measurement tasks, whose measurement objects are work carriers and trigger events are Event A1 or Event A2, in one measurement task group.

9. The method according to claim 8, wherein the report condition includes:
Condition 1: a first work carrier meeting an entry trigger condition of Event A1 appears in a corresponding measurement object of the measurement tasks in the measurement task group; and/or
Condition 2, a last work carrier meeting an entry trigger condition of Event A2 appears in a corresponding measurement object of the measurement tasks in the measurement task group.

10. The method according to claim 9, wherein, the report condition is Condition 1, the process that the UE determines whether measurement results of the measurement tasks in a measurement task group meet the report condition of the corresponding measurement task group includes:
the UE determines that the measurement results meet the report condition if the measurement tasks whose corresponding measurement objects meet the entry trigger condition of Event A1 exist in the measurement task group and a current value of a double-event counter is 1, wherein, when the measurement tasks whose corresponding measurement objects meet an entry trigger condition of Event A1 exist in the measurement task group, a value of the double-event counter increases by 1; when the measurement tasks whose corresponding measurement objects meet an entry trigger condition of Event A2 exist in the measurement task group, the value of the double-event counter decreases by 1; an initial value of the double-event counter is 0.

11. The method according to claim 9, wherein, the report condition is Condition 2, the process that the UE determines whether the measurement results of the measurement tasks in the measurement task group meet the report condition of the corresponding measurement task group includes:
the UE determines that the measurement results meet the report condition if the measurement tasks whose corresponding measurement objects meet the entry trigger condition of Event A2 exist in the measurement task group and a current value of a double-event counter is 0, wherein, when the measurement tasks whose corresponding measurement objects meet an entry trigger condition of Event A1 exist in the measurement task group, a value of the double-event counter increases by 1; when the measurement tasks whose corresponding measurement objects meet an entry trigger condition of Event A2 exist in the measurement task groups, the value of the double-event counter decreases by 1; an initial value of the double-event counter is 0.

12. The method according to claim 1, wherein dividing the measurement tasks into measurement task groups includes:
putting measurement tasks, whose measurement objects are one work carrier, whose measurement events are comparative events of one event type and whose comparative reference cells are different service cells, into one measurement task group.

13. The method according to claim 12, wherein the report condition includes:
there are M measurement tasks meeting respective event entry trigger condition, wherein, the M measurement tasks correspond to one cell of a measurement object in a measurement task group, M<=the number of measurement tasks contained in the measurement task group.

14. The method according to claim 13, wherein the report condition includes:
Condition 3: in relation to a reference cell of a respective measurement task, one adjacent cell of a measurement object corresponding to one measurement task in the measurement task group meets an entry trigger condition of a comparative event; and/or
Condition 4: in relation to respective reference cells of each measurement task of all measurement tasks, a same adjacent cell of measurement objects corresponding to all measurement tasks in the measurement task group meets an entry trigger condition of a comparative event; and/or
Condition 5: in relation to a reference cell of a respective measurement task, one adjacent cell of a measurement object corresponding to the measurement task in the measurement task group meets an exit trigger condition of a comparative event; and/or
Condition 6: in relation to respective reference cells of each measurement task of all measurement tasks, a same adjacent cell of measurement objects corresponding to all measurement tasks in the measurement task group meets an exit trigger condition of a comparative event;
wherein, the comparative event is Event A3 or Event A5.

15. The method according to claim 14, wherein, the report condition is Condition 3, the process that the UE determines whether measurement results of measurement tasks in a measurement task group meet the report condition of the corresponding measurement task group includes:
the UE determines that a measurement result meets the report condition when an adjacent cell of a measurement objects corresponding to one measurement task in the measurement task group meets an entry trigger condition of a comparative event in relation to a reference cell of the measurement task and a cell list of other measurement tasks in the measurement task group does not exist or the adjacent cell does not exist in the cell list.

16. The method according to claim 14, wherein, the report condition is Condition 4, the process that the UE determines whether measurement results of the measurement tasks in a measurement task group meet the report condition of the corresponding measurement task group includes:
the UE determines that a measurement result meets the report condition when an adjacent cell of a measurement object corresponding to one measurement task in the measurement task group meets an entry trigger condition of a comparative event in relation to a reference cell of the measurement task and the adjacent cell exists in a respective cell list of each measurement task in the measurement task group.

17. The method according to claim 14, wherein, when the report condition is Condition 5, the process that the UE determines whether measurement results of the measurement tasks in the measurement task group meet the report condition of the corresponding measurement task group includes:
the UE determines that a measurement result meets the report condition when an adjacent cell of a measurement objects corresponding to one measurement task in the measurement task group meets an exit trigger condition of a comparative event in relation to a reference cell of the measurement task and a cell list of the other measurement tasks in the measurement task group does not exist or the adjacent cell does not exist in the cell list.

18. The method according to claim 14, wherein, when the report condition is Condition 6, the process that the UE determines whether measurement results of the measurement tasks in a measurement task group meet the report condition of the corresponding measurement task group includes:
the UE determines that a measurement result meets the report condition when an adjacent cell of a measurement object corresponding to one measurement task in the measurement task group meets an exit trigger condition of a comparative event in relation to a reference cell of the measurement task and the adjacent cell exists in a respective cell list of each measurement task in the measurement task group.

19. A user equipment, comprising:
a grouping module, configured to divide measurement tasks into measurement task groups;
a determination module, configured to determine whether measurement results of respective measurement tasks in one of the measurement task groups meet a report condition of the corresponding measurement task group; and
a reporting module, configured to generate a measurement report according to the measurement result when a determination result of the determination module is yes, and report the measurement report.

20. A system for reporting measurement results in a multi-carrier system, including: a network side equipment and a UE, wherein,
the network side equipment includes:
a grouping module, configured to divide measurement tasks into measurement task groups; and
a designation module, configured to explicitly designate the measurement task groups to the UE in a measurement control message;
the UE includes:
a determination module, configured to determine whether measurement results of the measurement tasks in one of the measurement task groups meet a report condition of the corresponding measurement task group;
a reporting module, configured to generate a measurement report according to the measurement result when a determination result of the determination module is yes, and report the measurement report.

* * * * *